Patented Mar. 7, 1939

2,149,273

UNITED STATES PATENT OFFICE 2,149,273

POLYAMIDES

Wallace H. Carothers, Wilmington, Del., assignor to E. I. du Pont de Nemours & Company, Wilmington, Del., a corporation of Delaware No Drawing. Application January 13, 1937, Serial No. 120,460

7 Claims. (Cl. 260—2)

This invention relates to a synthetic resin and more particularly to a new type of polyamide resin.

In my prior application Serial Number 548,701, filed July 3, 1931, now Patent No. 2,071,250, I have described polyamides obtained by reacting diamines and dibasic acids. The polyamides so obtained are remarkable in that they may be formed into useful fibers showing by X-ray examination fiber orientation along the fiber axis. These polyamides, however, are not heat-hardenable and are of limited solubility and are therefore of limited value in the coating and molding arts. In order to obtain such fiber-forming polymers it is necessary to use bifunctional reactants because, as I have observed in the above mentioned application, the presence of more than two functional groups (as would be the case if the diamine were replaced by a triamine or the dibasic acid replaced by a tribasic acid) would result in a three-dimentional polyamide structure and not the linear fiber-forming polyamide with which the above mentioned application is concerned. The present invention, on the other hand, relates specifically to the new and valuable resinous polyamides obtainable from polybasic acid and polyamine reactants, one of which is higher than bifunctional.

This invention has as an object the preparation of new and useful polymeric products. A further object is to make resinous polyamides of improved properties. A still further object is to prepare products useful in the plastic, molding, coating, sizing, adhesive, impregnating, and related arts. Other objects will appear hereinafter.

These objects are accomplished by heating under polymerizing conditions (generally from 100 to 300° C.) reactants comprising a polyamine and a saturated aliphatic non-imide-forming polybasic acid or amide-forming derivative thereof, at least one of said reactants being higher than bifunctional (i. e., the sum of the amide-forming groups in said reactants is at least five), until a resinous product is obtained.

It is to be understood that the mention herein of "non-imide-forming polybasic acids" includes the amide-forming derivatives of these acids, such as the ester, half ester, anhydride, acid halide, and amide, as well as the acids themselves. With reference to the minimum number of amide-forming groups, it will be seen that if a dibasic acid is used the amine must be at least a triamine or if a diamine is used the polycarboxylic acid must be at least a tricarboxylic acid in order that the sum of the amide-forming groups, namely, amino and carboxyl, be at least five.

The polycarboxylic acids used in the practice of this invention are aliphatic and are non-imide-forming, that is, they have little tendency to form imides from their amides when the latter are heated under conditions for resin formation. Phthalic acid is unsuitable except in partial replacement of the aliphatic acid since phthalic acid has a marked tendency toward cyclization or imide formation. Thus the reaction of phthalic anhydride with diethylenetriamine leads to phthalimide formation which effectively blocks further polymerization and results in an acid soluble product of no value as a film-forming material. The dibasic acids having a radical length of five (the number of atoms in the chain between the two carboxyl groups plus the two carbon atoms of the carboxyl groups, these acids having a chain of at least three atoms joining the carboxyl groups), such as glutaric acid, and higher are in general valuable for the present purpose because of the little tendency of these acids in general to form imides. The preferred class of polybasic acids are the dicarboxylic acids having a radical length of at least six, or a chain of at least four atoms joining the carboxyl groups, such as adipic, since these acids have practically no tendency to form imides.

The term "polyamine" is used herein to indicate an organic amine containing at least two hydrogen-bearing nitrogen atoms, i. e., primary or secondary amino groups. Thus, ethylenediamine, $NH_2CH_2CH_2NH_2$, contains two functional amino groups; diethylenetriamine, $$NH_2CH_2CH_2NHCH_2CH_2NH_2$$

contains three functional amino groups; and triethylenetetramine, $$NH_2CH_2CH_2NHCH_2CH_2NHCH_2CH_2NH_2$$

contains four functional amino groups. On the other hand, a compound of the formula $$NH_2CH_2CH_2N(CH_3)CH_2CH_2NH_2$$

while it has three nitrogen atoms, contains only two functional amino groups.

The term "aliphatic" is used to indicate that the carboxyl groups of the polybasic acid are attached to aliphatic carbon atoms. It does not necessarily imply that the acid is an open chain compound, i. e., free from cyclic groups. Thus, many dibasic acids, e. g., diphenylolpropane diacetic acid, $HOOCCH_2OC_{15}H_{14}OCH_2COOH$, which contain an aromatic group but which have the carboxyl groups attached to aliphatic carbon atoms are useful particularly when employed in conjunction with open chain aliphatic polybasic acids.

The reaction for making the polyamides of this invention may be carried out in the absence of a solvent (fusion method), in the presence of a solvent, or in the presence of a non-solvent diluent. The reaction temperature required to obtain the polymeric product differs somewhat with the nature of the reactants employed but is generally in the neighborhood of 100-300° C., and preferably 150-275° C. Derivatives of the polybasic acid, such as the ester or acid chloride, react more readily than the free acid. The reaction by which the polymer is obtained is a condensation polymerization, which involves the formation of a by-product, such as water, alcohol, phenol, hydrogen chloride, or ammonia, depending upon the derivative of the polybasic acid used. Generally, it is desirable to effect the reaction under conditions which permit the escape of the water or other by-products, but this is not absolutely essential. The reaction is preferably carried out in the absence of air and sometimes the addition of antioxidants is desirable. While it is usually unnecessary to add a catalyst, inorganic materials of alkaline reaction such as oxides and carbonates and acidic materials such as halogen salts of polyvalent elements, e. g., aluminum or tin are often helpful. The reaction may be carried out in an open or closed reactor under atmospheric, super-atmospheric or sub-atmospheric pressures.

The following examples in which the parts are by weight are illustrative of my invention:

Example I

A mixture of 13 parts of adipic acid and 34.4 parts of diethylenetriamine was heated for 20 minutes at 220-225 C. under conditions which permitted the water formed in the reaction to distill out. The clear, light-yellow, resinous product thus obtained softened at about 50° C. and was soluble in water and in various alcohols. It yielded transparent films. Continued heating converted the resin into an insoluble, infusible product.

Example II

The salt prepared by adding an alcohol solution of 23.5 parts of adipic acid to a solution of 3 parts of diethylenetriamine, and 15.1 parts of hexamethylenediamine was heated with an equal weight of phenol for 1.5 hours in a bath at 220-225° C., allowing the water and part of the phenol to distill out. Upon pouring the solution into an excess of ethyl acetate, a light-colored granular precipitate of polymer was formed. This product melted at 235° C. and was soluble in phenol and in formic acid. The product proved useful in the preparation of films, sheets, and molded objects.

Example III

A solution of 14.6 parts of triethylenetetramine in 50 parts of ethanol was added to a solution of 68.8 parts of diphenylolpropane diacetic acid in 200 parts of ethanol. The salt which crystallized from this mixture was heated 0.5 hour at 230° C. and then for 1.5 hours at 220° C. The resultant condensation product was a hard brown resin which had a softening point of about 95° C. It was soluble in the ethyl ether of ethylene glycol and in ethanol-benzene mixtures. Solutions of the resin were useful in the preparation of coating compositions.

The examples illustrate the preparation of polyamides from various polyamines and aliphatic non-imide-forming polybasic acids, at least one of said reactants being higher than bifunctional. As indicated in Example II, it is possible to use more than one polyamine in the preparation of a polyamide. It is also possible to use more than one polybasic acid. If the major portion of the ingredients are bifunctional it is possible to obtain products which approach in properties the fiber-forming linear condensation polyamides described in the above mentioned application. As examples of additional polyamines and polybasic acids which may be used in the preparation of the products of this invention there may be mentioned ethylenediamine, tetramethylenediamine, pentamethylenediamine, octamethylenediamine, decamethylenediamine, p-xylylenediamine, di-(polymethylene) triamines (e. g., di-(hexamethylene) triamine), piperazine, tetramethyl piperazine, N-phenyl ethylenediamine, N-methyl ethylenediamine, N, N'-dimethyl ethylenediamine, glutaric acid, pimelic acid, suberic acid, azelaic acid, beta-methyl adipic acid, phenylene diacetic, resorcinol diacetic, camphoric acid, dithioglycoloc acid, and tricarballylic acid. It is also possible to use acids of the following types in connection with saturated aliphatic non-imide-forming polybasic acids: maleic, fumaric, muconic, acetylene dicarboxylic, malic, phthalic, etc. It is necessary that at least one of the polyfunctional reactants selected be higher than bifunctional. In general, it is desirable to use a plyamine as the reactant higher than bifunctional.

In the preparation of the products of this invention it is generally desirable to use the acids and amines in such proportions that the reactive amine and acid groups will be present in equimolecular amounts. Thus, if a triamine is reacted with a dibasic acid, the preferred proportions would be two moles of triamine and three of dibasic acid. In the examples given above the ratio of amine to acid groups is such that there is substantially one amino group for each acid or acylating group.

The products of this invention are for the most part resins, whose softening point and solubility are dependent upon the reactants used in their preparations. In general, the products are soluble in chlorinated hydrocarbons, esters, hydroxy ethers, phenols, formic acid, and mixtures of alcohols with aromatic hydrocarbons. In their initial state some of the products are soluble in water. On continued heating the products of this invention usually become insoluble, i. e., form three-dimensional polymers. For the most part, the products have good compatibility characteristics and can be admixed with drying oils, resins, plasticizers, and in some instances with cellulose derivatives. It is sometimes desirable to prepare the polyamide in the presence of substances of this type. The above properties make the products useful in the coating, plastic, sizing, impregnating, adhesive, and related arts.

The reaction described herein has also been a valuable addition to the coating art in that it has formed the basis for the manufacture of new products chemically modified with drying oils or oil acids, such as linseed, these improved products being the subject of the invention described in application Serial Number 120,459, filed of even date herewith by G. D. Graves. In accordance with this improvement it was found that the incorporation of materials containing the acid radical of a fatty oil (the fatty oil, the acids derived therefrom, or oil modified glyceryl phthalate resins) into the reaction mixture of the foregoing examples the resins obtained yield exceptionally tough and durable films. Resin acids, such as those of congo and rosin, may also be used as modifying agents.

As indicated above, this invention is capable of yielding valuable products of widely different properties depending upon the reactants selected for their preparation. The products, depending upon their properties, are useful in the coating, plastic, molding, sizing, impregnating, adhesive, textile, and related arts. In these various applications the products may be mixed with one another or with other agents such as plasticizer, resins, cellulose derivatives, pigments, fillers, dyes, and the like.

As many apparently widely different embodiments of this invention may be made without departing from the spirit and scope thereof, it is to be understood that I do not limit myself to the specific embodiments thereof except as defined in the appended claims.

I claim:

1. A resinous film-forming polymer which comprises the reaction product of reactants consisting essentially of polyamine and polybasic acid, the polyamine having at least two amino nitrogen atoms which are attached to aliphatic carbon atoms and which carry at least one hydrogen atom each, the polybasic acid being an aliphatic non-imide-forming polybasic carboxylic acid, of which two carboxyl groups are joined by a chain of at least three atoms, the reactive amino groups and acid groups in said reactants being present in substantially equimolecular proportions and the sum of the amide-forming groups in said reactants being at least five, said resinous polymer being identified by at least one of the characteristics consisting of insolubility with infusibility, and capability of being converted upon heat treatment into the insoluble, infusible state.

2. The polymer set forth in claim 1 in which said polyamine has at least three nitrogen atoms and said polybasic acid is a saturated aliphatic dibasic acid having a chain of at least three atoms joining the carboxyl groups.

3. The polymer set forth in claim 1 in which said polyamine comprises diamine and polyamine having at least three amino groups, and in which said polybasic acid is a saturated aliphatic non-imide-forming dibasic carboxylic acid having a chain of at least three atoms joining the carboxyl groups.

4. A process which comprises heating under polymerizing conditions until a resinous product is obtained reactants consisting essentially of polyamine and polybasic acid, the polyamine having at least two amino nitrogen atoms which are attached to aliphatic carbon atoms and which carry at least one hydrogen atom each, the polybasic acid being an aliphatic non-imide-forming polybasic carboxylic acid of which two carboxyl groups are joined by a chain of at least three atoms, the reactive amino groups and acid groups in said reactants being in substantially equimolecular proportions and the sum of the amide-forming groups in said reactants being at least five.

5. The process set forth in claim 4 in which the reaction is carried out in an inert solvent at a temperature of 100°–300° C.

6. The process set forth in claim 4 in which said polyamine has at least three nitrogen atoms and said polybasic acid is a saturated aliphatic dibasic acid having a chain of at least three atoms joining the carboxyl groups.

7. The process set forth in claim 4 in which said polyamine comprises diamine and polyamine having at least three amino groups and said polybasic acid is a saturated aliphatic dibasic acid having a chain of at least three atoms joining the carboxyl groups.

WALLACE H. CAROTHERS.

---

CERTIFICATE OF CORRECTION.

Patent No. 2,149,273.                    March 7, 1939.

WALLACE H. CAROTHERS.

It is hereby certified that error appears in the printed specification of the above numbered patent requiring correction as follows: Page 1, first column, line 21, for "three-dimentional" read three-dimensional; page 2, first column, line 37, for "13 parts" read 73 parts; line 39, for "220-225 C." read 220-225° C.; same page, second column, line 25, for "dithioglycoloc" read dithioglycolic; line 27, for the word "connection" read conjunction; line 33, for "plyamine" read polyamine; and that the said Letters Patent should be read with this correction therein that the same may conform to the record of the case in the Patent Office.

Signed and sealed this 20th day of June, A. D. 1939.

(Seal)

Henry Van Arsdale
Acting Commissioner of Patents.